(No Model.)

M. L. RITCHIE.
METHOD OF CLOSING THE ENDS OF WROUGHT IRON PIPES.

No. 339,812.          Patented Apr. 13, 1886.

Witnesses
Chas. H. Smith
J. Stail

Inventor
Matthew L. Ritchie.
per Lemuel W. Serrell
atty

UNITED STATES PATENT OFFICE.

MATTHEW L. RITCHIE, OF NEW YORK, N. Y., ASSIGNOR TO THE EAGLE TUBE COMPANY, OF SAME PLACE.

METHOD OF CLOSING THE ENDS OF WROUGHT-IRON PIPES.

SPECIFICATION forming part of Letters Patent No. 339,812, dated April 13, 1886.

Application filed August 31, 1885. Serial No. 175,706. (No model.)

*To all whom it may concern:*

Be it known that I, MATTHEW L. RITCHIE, of the city, county, and State of New York, have invented an Improvement in Closing the Ends of Wrought-Iron Pipes, of which the following is a specification.

Boilers have been constructed with a large central vertical tube from which horizontal tubes pass out radially, the outer end of each tube being closed by a disk that is welded into place, and in the construction of steam-radiators vertical wrought-iron tubes have been employed, the upper ends closed by welding.

My improvements are available for closing the ends of wrought-iron tubes, said tubes being employed for any purpose wherever available.

In the ordinary manner of welding in a disk at the end of a wrought-iron tube the metal of the tube is rendered thin around the edges of the disk in consequence of hammering the metal of the tube against the edges of the disk while in a heated condition. This renders the tube weak at the place where there is the most strain, and where as in a boiler-tube the risk of becoming heated and burned is the greatest.

My invention is made for more securely holding the disk in place within the end of the tube and for thickening the metal of the tube at and near the same, and for welding the edges of the disk and the interior of the tube together in the most secure and reliable manner.

Figure 1:
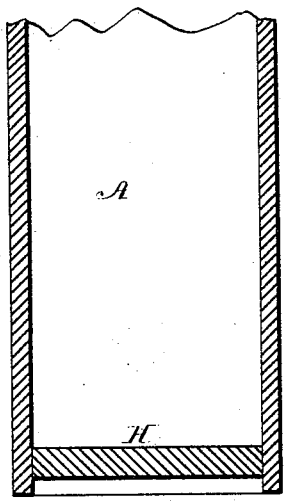
Figure 2:
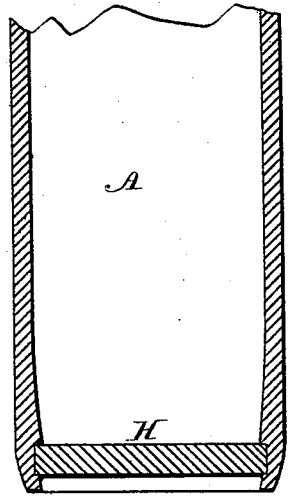
Figure 3:
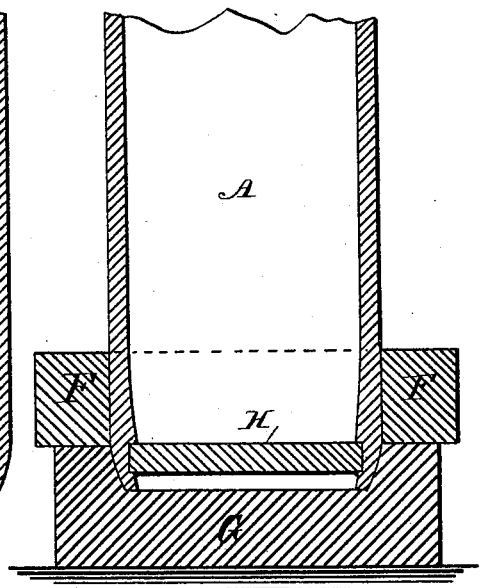

In the drawings, Figure 1 is a section of the tube and disk as put together ready for heating. Fig. 2 is a section of the parts after the welding has been effected. Fig. 3 is a section of the dies made use of in the welding operation, and Fig. 4 is a section of a modification for increasing the strength of the tube.

The tube A is of any desired size or length, and the disk H, of wrought-iron, is of a diameter to fit tightly within the end of the tube A, as heretofore employed. The disk is not at the extreme end of the tube, but a little distance inside the same—say a one-sixteenth or one-eighth of an inch. In this condition a flux—such as borax—is applied upon the surface of the disk, and the tube and disk are heated to a welding-heat for a distance of, say, three to five inches. The tube is now taken from the fire and the end introduced into the die F and cup G. This cup is of the same diameter upon its upper edge as the tube A, and the die F is also of the same interior diameter as the exterior tube. The tube A is passed into the die F, and the end thereof also enters the cup G. Pressure or concussion is now applied, either by a hammer or otherwise, to drive the tube into the cup G; hence there is a twofold action. The pressure or concussion tends to thicken out or upset the heated portion of the tube and bend the end of the tube over around the edge of the disk, and the thickening of the tube causes the metal to press against the edges of the disk and produce a very reliable weld at the joint. The die F prevents the metal spreading outwardly as the tube is upset, and this die F should be moved along on the outside of the tube, or the tube forced through the same, in order that the tube may be rendered equal in diameter throughout. This is especially necessary where the tubes are used radially from a central column, because such tubes usually are passed from the inside out through the boiler shell, and the inner ends are expanded at the inner and outer sides of such boiler-shell. By this construction the tube is rendered thickest at and near the end where it is exposed to the greatest heat and to the most injurious influences.

It will be apparent that in cases where the exterior of the tube A can be increased in size by the upsetting operation without thereby being injured the die F will not be necessary.

Figure 4:
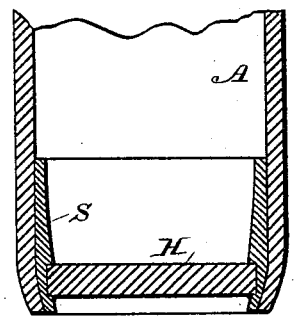

To furnish an additional strength, a thin metallic tube, S, may be introduced within the end of the tube A, as seen in Fig. 4, previous to the parts being heated to a welding temperature, the disk H being introduced within the tube S. The mode of operation is the same as before described, the welding uniting the tubes A, and S into one, and these are thickened by the upsetting action, and the disk is closed in a most reliable manner.

I claim as my invention—

1. The method herein specified of securing metallic disks within the ends of wrought-iron pipes, consisting in heating the disk and the end of the pipe near the disk to a welding-temperature and thickening the metal of the pipe, and welding the disk and pipe together by endwise pressure upon the same while confined within the cup, substantially as set forth.

2. The method herein specified of securing metallic disks within wrought-iron tubes and rendering the exterior of the tube of uniform diameter, consisting in heating the disk and end portion of the tube to a welding-temperature, inserting the same into a die and cup, applying concussion or pressure endwise of the tube to thicken the same and weld the disk therein, then passing the tube through the die to reduce the exterior of the diameter of the tube to a uniform size, substantially as set forth.

Signed by me this 25th day of August, A. D. 1885.

M. L. RITCHIE.

Witnesses:
  GEO. T. PINCKNEY,
  WILLIAM G. MOTT.